Dec. 13, 1927.
J. S. HOLLIDAY
1,652,405
SYSTEM AND APPARATUS FOR MEASURING ELECTRICAL RESISTANCE
Filed March 22, 1922
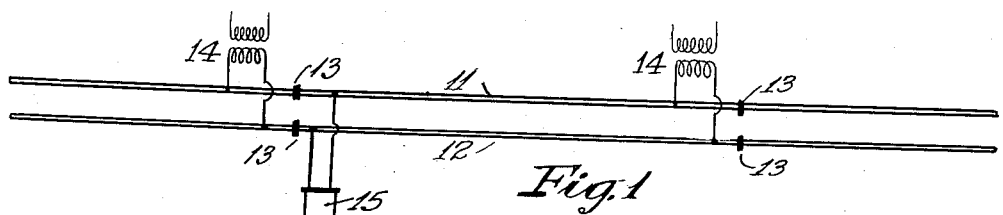
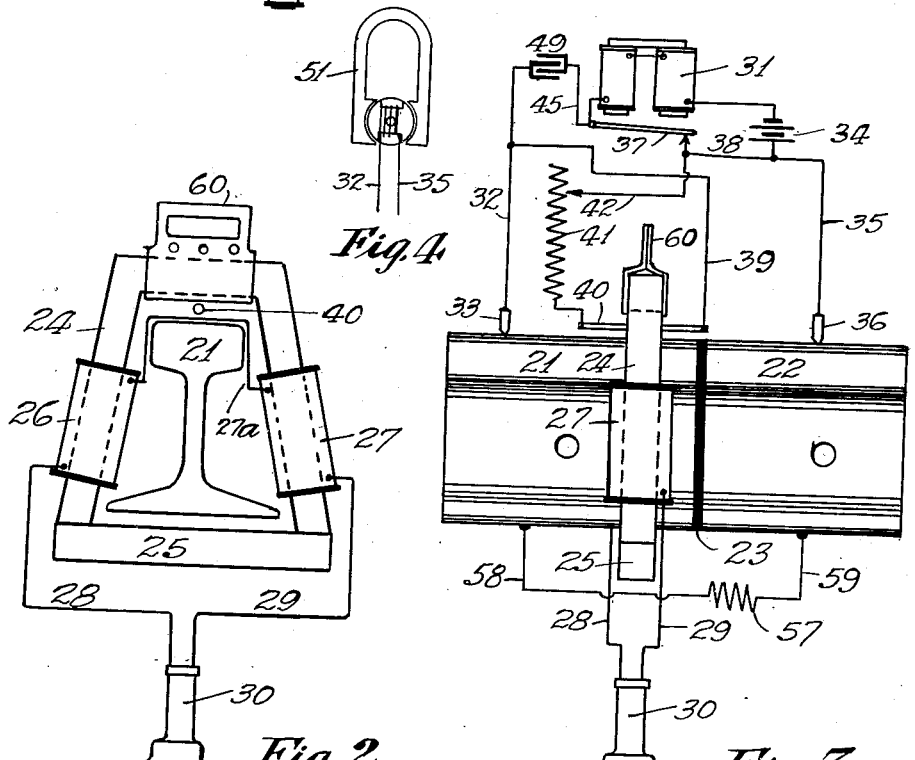
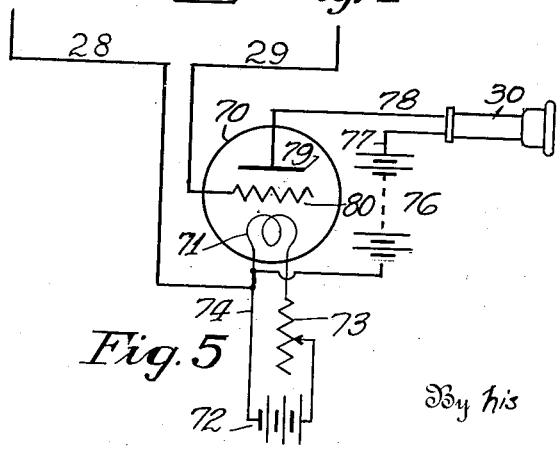
Inventor
John S. Holliday
By his Attorney Patented Dec. 13, 1927.

1,652,405

UNITED STATES PATENT OFFICE.

JOHN S. HOLLIDAY, OF NEW YORK, N. Y.; J. MARGARET HOLLIDAY, ADMINISTRATRIX OF SAID JOHN S. HOLLIDAY, DECEASED, ASSIGNOR TO MATTHEW H. LOUGHRIDGE, TRUSTEE, OF BOGOTA, NEW JERSEY.

SYSTEM AND APPARATUS FOR MEASURING ELECTRICAL RESISTANCE.

Application filed March 22, 1922. Serial No. 545,786.

This invention relates to a system and apparatus used therewith, for measuring resistance and is particularly useful for measuring the resistance of one of a number of multiple paths of a circuit, said paths being of unknown resistance. This invention also includes certain novel features whereby the resistance of a joint may be measured by direct reading without interrupting the circuit which may be conducted through the joint.

In the specification and drawings, this invention is described as applied to measuring the resistance of an insulated joint in a railway track circuit. This, however, is only one feature of its application which may be extended to a great variety of purposes, such as measuring the resistance of the joints in a bridge, etc.

This invention provides a means for measuring the resistance of a circuit which may have a number of multiple paths of unknown resistance, and is based upon the principle of measuring a resistance by balancing it against a known resistance, the balance being determined by electro-magnetic induction, thereby giving results by direct reading. This invention will be understood from the following specification and the accompanying drawings in which Fig. 1 shows a conventional track circuit as applied on railroads, Fig. 2 is a sectional elevation of the apparatus used with this invention, Fig. 3 is a side view corresponding to Fig. 2, also showing the circuit connections, Fig. 4 shows an alternative means of producing an A. C. supply by means of a magneto, and Fig. 5 shows a circuit arrangement using an amplifier.

This invention includes a transformer core placed around the conductor carrying the current, the resistance of which is to be measured. This transformer has a coil connected to a telephone receiver. A generator is provided to produce an alternating current preferably of high frequency, which is connected across the joint, the resistance of which is to be measured. An auxiliary conductor is also included within the transformer core and connected to the same generator, arranged however, to conduct the current in the opposite direction to the current in the conductor under test. When the currents in these two conductors are equal there is no sound produced in the telephone receiver but when these currents are unequal a buzzing sound is produced in the receiver by the varying magnetic flux produced in the core. A variable resistance is provided to regulate the current in the auxiliary conductor until it equals the current in the conductor under test. The resistance in the circuit of the auxiliary conductor, under these conditions, is equal to the resistance of the joint being tested. These tests can be carried on without in any way disturbing the circuit already established in the conductor. The frequency of the testing current is so high that even the sound created by the testing current in the telephone can be easily distinguished from the sound created by the other current in the circuit.

In the drawings, 11 and 12 represent the running rails of a railroad track, 13 represents insulated joints which divide the track into track circuit sections, usually having a battery or transformer connected at one end as indicated at 14 and a relay connected at the opposite end as indicated at 15. The proper operation and in fact, the safety of the block system usually depend upon maintaining a high insulation in the joints 13 and the present invention provides a ready means for testing the insulation resistance of these joints without disconnecting any of the apparatus associated with the track circuits.

In Fig. 3, 21 and 22 represent the abutting ends of two rails having an insulated end post 23 constituting part of an insulated joint. Under the severe conditions to which this insulation is subjected it has a tendency to break down and a break-down of this kind is not readily detected by inspection.

24 represents a transformer arranged to enclose three sides of the rail as indicated in Fig. 2 and provided with a bar 25 to close the magnetic circuit around the rail. Coils 26 and 27 may be provided on the legs of this transformer having wires 28 and 29 connecting to the telephone receiver 30. A handle of leather or fibrous material 60 may be provided for convenience in carrying around this transformer element.

A source of pulsating current is provided by the buzzer 31 connecting by wire 45, condenser 49, wire 32 and contact 33 with rail 21 and on the opposite side connecting to rail 22 through contact 36, wire 35, battery 34 to the buzzer coils. A local circuit is established from battery 34 through wires 38 and contact 37 of the buzzer. The condenser 49 insulates battery 34 from the conductor under test. As the buzzer interrupts the circuit a high frequency E. M. F. is impressed upon the rails 21 and 22 and part of the current caused thereby tends to leak through the end post 23 or the insulation of the joint. Connected with wire 32 is wire 39, connecting to the auxiliary conductor 40 which passes through the transformer core parallel with the rail head. The opposite end of this conductor connects to the variable resistance 41 and by wires 42 and 38 connects to wire 35. It will be noted from this arrangement that the current in the auxiliary conductor 40 passes through the transformer core in the direction opposed to the current from contact 33 to contact 36 through the rails and if these two currents are equal, they will neutralize each other. These currents will naturally be equal when the resistances in the two circuits are equal. This is determined by the sound in the telephone receiver. This sound is by this arrangement caused by the difference in the currents in these two paths and as this difference becomes less and less the sound gradually dies out until it disappears, indicating a balance between these currents. This balance is obtained by varying the resistance 41 and gives, by direct reading, the value of the resistance between the rails 21 and 22. It is apparent that when the resistance of the joint is very high and the leakage path is very low there would be practically no current or leakage through the joint against which a measurement could be taken, in this case the entire current in the conductor 40 would influence the detector and telephones directly proportional to the value of resistance 41 thereby indicating that the resistance of the joint approached infinity.

Any source of alternating current may be used for the buzzer 31 such as the magneto 51 which is well-known in the electrical art. In certain applications such as measuring the resistance of I beams it may not be possible to place a transformer core entirely around the path the resistance of which is to be measured. In this case, it is found that the apparatus will work without the bar 25, though it is somewhat less sensitive. It is also possible in applications of this kind to place the legs of the transformer core directly against the flange of the rail or the iron to be tested, so that the magnetic circuit of the transformer may be completed through the conductor which is under test.

It will be noted that in the application of this system only the current passing through a joint itself is measured. Current passing through any other path and leaking between the rails 21 and 22 does not affect the working of this device. For instance, the unknown resistance 57, Fig. 3, connecting to the rails by wires 58 and 59 may represent the ground resistance between abutting rails; the leakage current through this path, however, does not pass through the transformer 24 and, therefore, does not influence the operation of this testing system. In the present application, it should be noted that the circuit between the rails is practically non-inductive and the resistance 41 is non-inductive, so that although alternating current is used in connection with this device, it gives a direct reading in ohms of the actual resistance of the joints.

It has been stated that a high frequency source of alternating current is preferred in the application of this invention. This is desirable for two reasons. In a great many cases where this device may be used to test resistance, alternating current of a comparatively low frequency may be present in the circuit to be tested. For instance on a railroad track alternating current track circuits are quite common. Also alternating current propulsion is used in certain railroads and the track rails are used for the return side of the circuit. By making the testing current of a frequency of not less than five hundred cycles per second, this circuit can easily be superposed on another alternating current circuit of a commercial frequency of sixty cycles and the difference in operation can readily be detected in the telephone receiver. Another and highly important reason for using a source of a high frequency current is due to the fact that the intensity of the sound in the telephone increases proportional to the square of the frequency, thus creating a distinctive sound for a very small current.

In the practical application of this device it has been found that the arrangement similar to Fig. 3 will give very good results when the proportion between the leakage resistance and the joint resistance is within certain limits. When, however, the leakage resistance is low and the joint resistance is high, the operating conditions are not so favorable and under these conditions I prefer to use an amplifier such as is indicated in the typical circuit shown in Fig. 5. The use of the amplifier also enables very feeble currents through the joint itself to be detected and thus enables the testing apparatus to be operated with a comparatively small generating outfit which, without the amplifier, would have to be materially increased in size in order to maintain the impressed voltage on both sides of the joint when the leakage resistance is low.

The amplifier is applied on the telephone circuit and is arranged according to well-known principles in which 70 represents a vacuum tube type of amplifier having a filament 71 connecting by wire 74 to the battery 72 and by the variable resistance 73 to the other side of the filament which is thus heated when the tube is in active use. The telephone receiver 30 connects by wire 78 to the plate 79 and on the opposite side by wire 77 to battery 76 and to wire 74, forming one side of the circuit to the filament 71. This impresses the voltage of battery 76 between plate 79 and filament 71 and the current passing between these two points is controlled by the voltage between the grid 80 and the coil 71. The grid 80, it will be noted, connects to wire 29 and the filament 71 connects to wire 28, these wires in turn connecting to the coils of the transformer as indicated in Fig. 2. This arrangement is well understood in the applications of amplifiers of the vacuum tube type. However, other types of amplifiers may be used in connection with this invention.

This arrangement of balancing the circuit of the conductor to be tested against an auxiliary conductor or circuit having known resistance is the most practical and simplest method of applying my invention and does not require any special care in winding the coils, selecting or assembling the apparatus. However, the method of comparing the circuit of the conductor under test with a circuit of known resistance can be obtained by variations of the principles of this invention without departing from the intent and spirit thereof.

Having thus described my invention, I claim:

1. In a system for measuring the electrical resistance of a conductor, the combination of a source of A. C. supply connected with the conductor to be tested and an auxiliary conductor having a variable resistance in its circuit connected with the same A. C. source, said auxiliary conductor being insulated from said conductor under test and means for determining by electro-magnetic induction when the simultaneous currents in said conductors are equal.

2. In a system for measuring the electrical resistance of a conductor, the combination of a source of A. C. supply connected with the conductor to be tested and an auxiliary conductor having a variable resistance in its circuit connected with the same source and arranged so that the current in it can be compared with the current in the conductor under test and means for determining by electro-magnetic induction when the currents in said conductors are equal.

3. In a system for measuring the resistance of an electrical conductor, the combination of means for producing an A. C. voltage impressed on said conductor and means for impressing an A. C. voltage in the opposite direction on an auxiliary conductor, means for varying the resistance of said auxiliary conductor and means for determining when the currents in said conductors are equal.

4. In a system for measuring the resistance of one conductor in a multiple circuit having other conductors of unknown resistance, the combination of means for producing an A. C. voltage imposed on the conductor to be tested and the same A. C. voltage imposed on an auxiliary conductor, means for varying the resistance in the circuit of said auxiliary conductor, said auxiliary conductor insulated from the conductor under test, a transformer element adjacent the conductor under test and said auxiliary conductor and means including said transformer for determining when the currents in said conductors are equal.

5. In a system for measuring the resistance of one conductor in a multiple circuit having other paths of unknown resistance, the combination of means for producing an A. C. voltage impressed on the conductor to be tested and the same A. C. voltage impressed on an auxiliary conductor, means for varying the resistance of said auxiliary conductor, a transformer element adjacent the conductor under test and the auxiliary conductor and means for finding a balance between the currents in said conductors.

6. In a system for measuring the electrical resistance of a conductor, the combination of a source of A. C. supply connected with the conductor to be tested and an auxiliary conductor having a variable resistance in its circuit connected with the same A. C. source, said conductors arranged parallel and insulated from each other and so connected that the current in one is opposite in direction to the current in the other, a transformer core surrounding said conductors and means including said transformer for simultaneously determining the difference between the currents in said conductors.

7. In a system for measuring the electrical resistance of a conductor, the combination of a source of A. C. supply connected with the conductor to be tested and an auxiliary conductor having a variable resistance in its circuit connected with the same A. C. supply and arranged so that the current in it is relatively in the opposite direction to the current in the conductor under test, said auxiliary conductor insulated from the conductor under test and inductive means for determining the difference between the currents in said conductors.

8. In a system for measuring by direct reading the electrical resistance of a conductor, in a multiple circuit having other paths of unknown resistance, the combination of an A. C. source, an auxiliary conductor of known resistance, said source directly connected with the conductor under test and said auxiliary conductor, a transformer core surrounding said conductors and a telephone receiver connected with said transformer.

9. In a system for measuring the electrical resistance of a conductor in a multiple circuit having other paths of unknown resistance, the combination of an A. C. source, an auxiliary conductor, a variable resistance in the circuit of said auxiliary conductor, said source connected with the conductor, under test and said auxiliary conductor, a transformer core surrounding said conductors and a telephone receiver connected with said transformer.

10. In a system for measuring the electrical resistance of a conductor, the combination of a source of A. C. supply connected with the conductor to be tested and an auxiliary conductor having a variable resistance in its circuit connected with the same A. C. source and arranged so that the current in it opposes the current in the conductor under test, said auxiliary conductor being insulated from the conductor under test, a transformer core surrounding said conductors and a telephone receiver connected with said transformer.

11. In a system for measuring the resistance of an electrical conductor, the combination of a source of A. C. supply connected to said conductor, a transformer core surrounding said conductor between the points where said supply is connected, an auxiliary conductor passing through said transformer core and connected through a resistance with said A. C. supply and a telephone receiver connected with said transformer.

12. In a system for measuring the resistance of a conductor where unknown currents are present, the combination of a source of A. C. supply of a characteristic frequency connected with the conductor to be tested and an auxiliary conductor having a variable resistance in its circuit connected to the same A. C. source and arranged so that the current in it can be compared with the current in the conductor under test, a transformer adjacent said conductors and a telephone receiver connected with said transformer.

13. In a system for measuring the resistance of a conductor where unknown currents are present, the combination of a source of A. C. supply of a characteristic frequency connected with the conductor to be tested and an auxiliary conductor having a variable resistance in its circuit connected to the same A. C. source and insulated from the conductor to be tested and suitable means for determining by tone when the currents in said conductors are equal.

14. In a system for measuring the resistance of an electrical conductor by direct reading, the combination of a conductor connected with a source of A. C., an auxiliary conductor connected with the same source, a variable non-inductive resistance in the circuit of said auxiliary conductor and means for determining when the currents in said conductors are equal.

15. In a system for measuring the resistance of an electrical conductor in a circuit having multiple paths of unknown resistance, the combination of a source of A. C. supply with its terminals connected one at each end of the conductor under test, a transformer core surrounding said conductor between said connections and a telephone receiver connected with said transformer.

Signed at New York city, in the county of New York, and State of New York, this 4th day of Nov., A. D. 1921.

JOHN S. HOLLIDAY.